(12) United States Patent
Mitsuda et al.

(10) Patent No.: US 7,300,263 B2
(45) Date of Patent: Nov. 27, 2007

(54) PUMP

(75) Inventors: Kimihiko Mitsuda, Hyogo-ken (JP);
Yasuharu Yamamoto, Hyogo-ken (JP);
Toshiyuki Osada, Hyogo-ken (JP);
Masashi Tagawa, Hyogo-ken (JP);
Masatake Maekawa, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 72 days.

(21) Appl. No.: 11/106,664

(22) Filed: Apr. 15, 2005

(65) Prior Publication Data

US 2005/0238510 A1 Oct. 27, 2005

(30) Foreign Application Priority Data

Apr. 23, 2004 (JP) ............................. 2004-128443

(51) Int. Cl.
*F04B 17/03* (2006.01)

(52) U.S. Cl. ...................... 417/423.7; 310/86; 310/90; 417/369

(58) Field of Classification Search ........... 417/423.12, 417/369, 423.7; 310/86, 87, 90
See application file for complete search history.

(56) References Cited

U.S. PATENT DOCUMENTS

| | | | | |
|---|---|---|---|---|
| 2,419,588 A | * | 4/1947 | Pasco | ......................... 277/395 |
| 2,718,193 A | * | 9/1955 | Zimsky | .................. 417/423.12 |
| 2,965,386 A | * | 12/1960 | Buske | .................... 280/47.371 |
| 3,518,471 A | * | 6/1970 | Wightman et al. | ............ 310/90 |
| 5,291,087 A | * | 3/1994 | Pollick et al. | ................. 310/86 |

FOREIGN PATENT DOCUMENTS

| | | |
|---|---|---|
| JP | 61-31717 A | 2/1986 |
| JP | 5-271465 A | 10/1993 |
| JP | 6-31198 Y2 | 8/1994 |
| JP | 9-280190 A | 10/1997 |
| JP | 11-324971 A | 11/1999 |
| JP | 2001-241393 A | 9/2001 |
| JP | 2001-271939 A | 10/2001 |
| JP | 2001-280296 A | 10/2001 |
| JP | 2002-39091 A | 2/2002 |
| JP | 2003-56469 A | 2/2003 |
| WO | WO-01/86158 A1 | 11/2001 |

* cited by examiner

*Primary Examiner*—Michael Koczo, Jr.
(74) *Attorney, Agent, or Firm*—Birch, Stewart, Kolasch & Birch, LLP

(57) ABSTRACT

In a pump conveying a supercritical fluid or a liquid are provided stator slots and motor mold members which are charged between the stator slots, so as to have a stator can of a motor driving the pump from the outside thereof. Additionally, by providing a main shaft of a motor driving the pump and bearings supporting the main shaft with clearance-fitting and by tightening inner rings of the bearings to the main shaft in an axial direction, the bearings are fixed to the main shaft.

11 Claims, 8 Drawing Sheets

FIG4.B

PUMP

BACKGROUND OF THE INVENTION

1. Field of the Invention

The present invention relates to a pump which conveys a supercritical fluid or a liquid.

2. Description of the Prior Art

As one example of a pump which conveys a supercritical carbon dioxide ($CO_2$) fluid or a liquid carbon dioxide, there is a circulation pump for cleaning the semiconductors. Along with high integration of the semiconductor devices in recent years, it is sought to have the wafers processed so as to be fine and minute in width. Therefore, against the present mainstream width of a wafer which is 0.18 μm, it is expected that the width thereof will be 0.10 μm or less. However, in the semiconductor-cleaning method which uses a conventional liquid such as extra-pure water and the like, when the wafer is dried, there is a case where such a phenomenon occurs as a resist being formed to the wafer is destroyed ("resist collapse") by the capillary force which is caused by the boundary tension between the gaseous body and the liquid.

In order to eliminate the above-mentioned disadvantage, is developed a semiconductor-cleaning equipment which uses a supercritical fluid, instead of the conventional liquid such as extra-pure water. Compared with a liquid, the supercritical fluid has a very high permeability and can interpenetrate into any microscopic structure. In addition, because there exists no interface between the gaseous body and the liquid, it has such a characteristic as the capillary force does not work at the dime of drying.

As the supercritical fluid, mainly carbon dioxide ($CO_2$) is used. Compared with other liquid vehicles, the carbon dioxide has a critical density of 468 $kg/m^3$ on relatively moderate conditions, namely, that the critical temperature is 31.2° C. and the critical pressure is 7.38 Mpa. Furthermore, because the carbon dioxide is a gaseous body at a normal temperature and at normal pressures, it is gasified by returning the temperature and the pressure to be normal so that it is easy to separate an object to be cleaned from a contaminator. As a result, it will become unnecessary to dry the object to be cleaned after cleaning and the like, thereby making it possible to simplify the cleaning process and to reduce costs.

In such a semiconductor-cleaning equipment which uses a supercritical $CO_2$ fluid as mentioned above, the supercritical $CO_2$ fluid is generally pressurized to be approximately 20 Mpa. Therefore, so-called "having-no-seals" canned motor pump type is used, which has high pressure-tightness and produces a small number of particles, as a circulation pump for cleaning of the wafers by circulating the supercritical $CO_2$ fluid. Additionally, ball bearings are used for bearings, which are used in the fluid serving as a cleaning agent of semiconductors (supercritical $CO_2$ fluid).

The above-mentioned ball bearings receive the radial load and thrust load, which act on a rotor. Additionally, the preload is controlled by a preload spring which is installed to the bearing on the axial end side, being opposite to a bearing on the impeller side, which will be described later, and thereby so-called revolution skidding (side skidding) of a ball bearing is prevented. Moreover, rigidity (spring constant) in the radial direction of a ball bearing is controlled by the preload of the bearing, thereby adjusting the natural vibration frequency of the rotor.

As for the rest, is disclosed a canned motor pump which has a filter for capturing particles mounted in the fluid-introduction passageway. (For example, refer to the official bulletin of the Japanese Patent Application Laid-Open No. H11-324971.) By this, solid particles being included in the fluid are captured by the filter, so that the fluid containing no solid particles will be introduced into the inside of the motor. As a result, the fluid can flow smoothly in a narrow gap between the bearings of the motor portion or between the cans and the like, thereby being able to perform cooling and lubrication without damaging these members.

Or else, is disclosed a pump having a construction that integrates a fluid machinery which is driven by a driving machine; flow-volume-control means which control the flow volume of the handled fluid flowing inside the fluid machinery; activating means which operate the flow-volume-control means; and revolution-speed-control means which control the revolution speed of the driving machinery. (For example, refer to the official bulletin of the Japanese Patent Application Laid-Open No. 2003-56469.) By this, it is possible to integrate the fluid machinery, the revolution-speed-control system and the flow-volume-control system as one package. As a result, it is possible to simplify the installation work of the fluid machinery, thereby achieving labor-saving and natural-resources-saving.

However, in the future semiconductor-cleaning equipment, in order to enhance the cleaning ability of the wafers, it is necessary to increase the conveying flow volume of the fluid serving as a cleaning agent. Therefore, a pump for conveying the fluid is required to have a higher capacity. On the other hand, in order to save the space of the semiconductor-cleaning equipment, it is necessary to downsize the pump further. Therefore, contradictory requirements for a pump for cleaning the semiconductors, in other words, larger capacity and smaller size of the pump, must be satisfied.

SUMMARY OF THE INVENTION

It is an object of the present invention to provide a pump for a semiconductor-cleaning equipment which is in simple configurations, has a large capacity but is small in size, and in addition, can assure reliability.

In order to achieve the above-mentioned object, according to the present invention, a pump which conveys a supercritical fluid or a liquid is so constructed as stator slots and motor mold members which are charged between the stator slots are installed, in order that the stator cans of a motor driving the pump are supported from the outside thereof.

Moreover, a pump which conveys a supercritical fluid or a liquid is so constructed as by providing clearance-fitting to a main shaft of a motor driving the pump and to bearings which support the main shaft and by tightening the inner rings of the bearings to the main shaft in the axial direction, the bearings are fixed to the main shaft.

Additionally, a pump which conveys a supercritical fluid or a liquid is so constructed as the gap between a stator and a rotor is determined, in order that the shaft system of a motor driving the pump is provided with damping.

Furthermore, a pump which conveys a supercritical fluid or a liquid is so constructed as the distance between the bearings of the main shaft of a motor is determined, in order that natural vibration frequency of the motor driving the pump deviates from the range of the revolution speed.

In addition, a pump which conveys a supercritical fluid or a liquid is so constructed as the thrust force which is applied to a rotor is adjusted by adjusting the cooling flow volume of a motor driving the pump as well as the configuration of a rotor.

DESCRIPTION OF THE DRAWINGS

FIG. 4A and FIG. 4B depict a normal corrugated plate spring.

DESCRIPTION OF THE PREFERRED EMBODIMENTS

Figure 1:
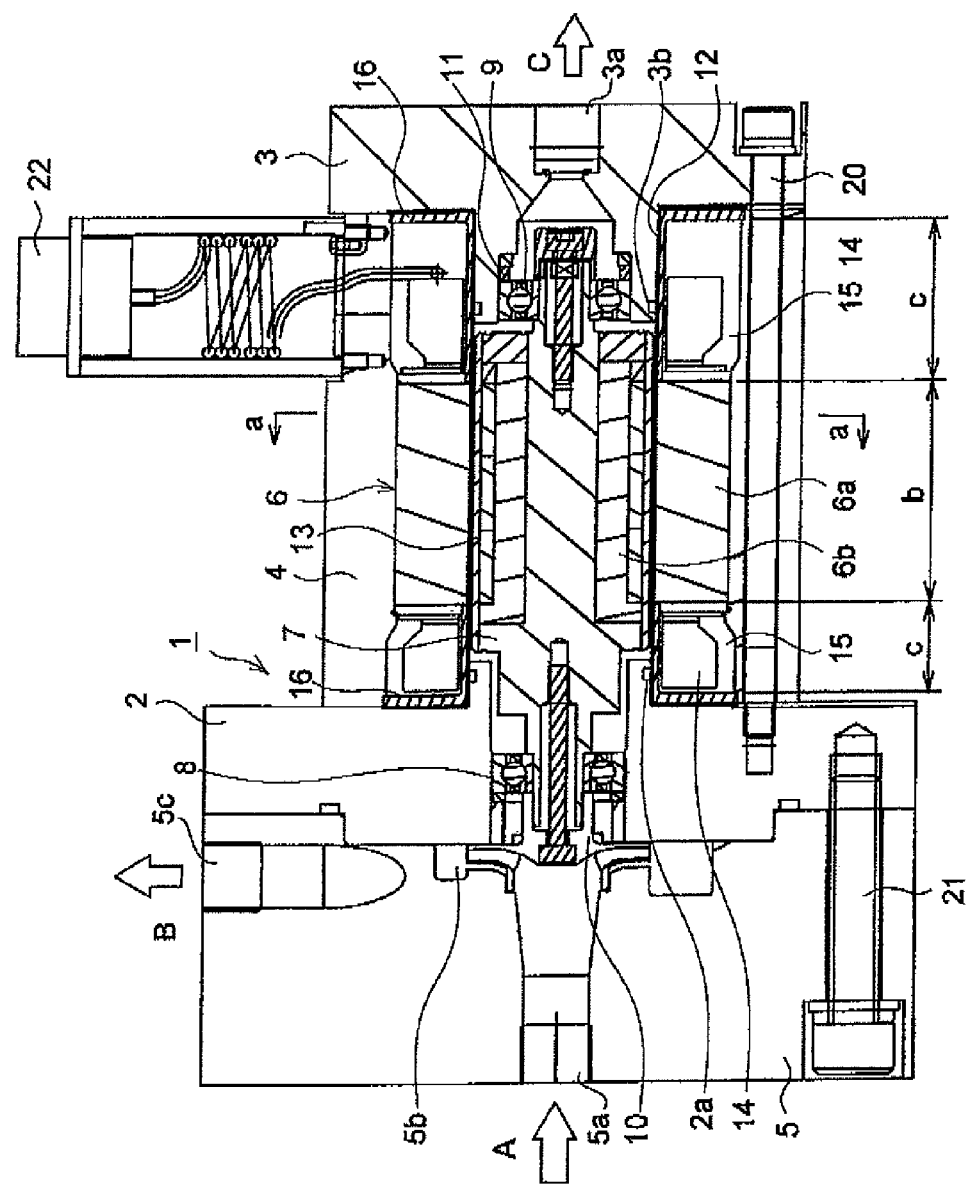
FIG. 1 is a longitudinal cross-sectional view showing a construction of a circulation pump for cleaning semiconductors in accordance with the embodiment of the present invention.

Referring now to the drawings, an embodiment of the present invention will be described hereinafter. The embodiment of the present invention shows an example of a pump which conveys a supercritical $CO_2$ fluid, but is not limited to, and is applicable to a supercritical fluid, a liquid and the like in general. Additionally, concrete examples of the supercritical fluid, the liquid and the like include $CO_2$, water, methanol and the like.

Embodiment

FIG. 1 is a longitudinal cross-sectional view showing a construction of a circulation pump for cleaning semiconductors in accordance with the embodiment of the present invention. A circulation pump 1 has a discharge/suction-side casing 2, a purging-side casing 3 and an outer cylinder 4 held by the discharge/suction-side casing 2 and the purging-side casing 3. Outside the discharge/suction-side casing 2, is installed a manifold 5 which sucks and discharges the fluid.

Inside the outer cylinder 4 is installed a canned motor 6 which drives the circulation pump 1 and is provided with a stator 6a outside thereof and a rotor 6b being housed in the stator 6a. The rotor 6b is installed to a main shaft 7; and the main shaft 7 is supported on both ends thereof by an angular ball bearing 8 being installed to the discharge/suction-side casing 2 and an angular ball bearing 9 being installed to the purging-side casing 3 so as to rotate.

Between the discharge/suction-side casing 2 and the manifold 5 is installed an impeller 10, which is mounted onto one end of the main shaft 7 and rotates simultaneously with the main shaft 7. The manifold 5 has a suction port 5a for the fluid mounted onto the extension line from one end of the main shaft 7; and has a spiral casing 5b mounted around the impeller 10. Additionally, a discharge port 5c opens from one portion of the periphery portion of the spiral casing/pathway 5b toward the outer circumference surface of the manifold 5 in a radial direction.

On the other hand, the purging-side casing 3 has a purging port 3a mounted onto the extension line from the other end of the main shaft 7, which discharges a part of the fluid being sucked. As for the rest, a preload spring 11 is held between the purging-side casing 3 and the angular ball bearing 9. This is a corrugated plate spring in a shape of a ring being located in the vicinity of the other end of the main shaft 7 and provides an axial preload to the angular ball bearing 9 as a constant-pressure spring method.

In addition, the angular ball bearing 8 is referred as an impeller-side bearing, while the angular ball bearing 9 is referred as a shaft-end-side bearing. The item 20 in the figure is a bolt which connects the discharge/suction-side casing 2 and the purging-side casing 3; the item 21 is a bolt which connects the discharge/suction-side casing 2 and the manifold 5; and the item 22 is a socket for connecting to an electrical cable.

In a circulation pump 1 as described above, when the rotor 6b of the canned motor 6 and the main shaft 7 rotate, which makes the impeller 10 rotate simultaneously, the fluid is sucked through the suction port 5a as shown with an arrow A, introduced into the spiral casing/pathway 5b by the centrifugal force of the impeller 10 and is discharged through the discharge port 5c in the end as shown with an arrow B. Additionally, a part of the fluid being sucked through the suction port 5a passes between the angular ball bearings 8 and 9 and the main shaft stator in the canned motor 6, cooling them, and is discharged through the purging port 3a as a purging flow, as shown with an arrow C.

Now, on the inner circumference surface of the above-mentioned stator 6a is installed a stator can 12 which is thin-walled and cylindrical. On the other hand, on the outer circumference surface of the above-mentioned rotor 6b is installed a rotor can 13 which is thin-walled and cylindrical. In the embodiment of the present invention, because a supercritical $CO_2$ fluid is conveyed by pressure feed, the inlet pressure of a pump becomes 20 MPa. However, because a canned motor pump has no seals, a pressure which is equivalent to the inlet pressure is provided to the motor portion, too.

Therefore, the motor portion is required to be so constructed as has pressure tightness. Furthermore, because strong acids such as hydrochloric acid, sulfuric acid, fluorinated acid, phosphoric acid and the like are used as chemicals for cleaning the semi-conductors, the motor portion must be protected from these chemicals. In consequence, stainless steel (SUS 316L) having high corrosion resistance or Hastelloy C-22 (R) is used for the stator can 12 and the rotor can 13.

However, when the wall thickness of the stator can is increased in order to make the motor portion be constructed so as to have pressure tightness, a loss (eddy current loss) will be increased for an amount of the increase in wall thickness. Consequently, in order to restrain heat generation of the motor portion and besides increase the driving efficiency, the stator can 12 cannot be made so thick. In other words, a trade-off designing is necessary, which takes account of the balance between enhancement of pressure-tight performance of the motor portion and reduction in loss. Therefore, in the embodiment of the present invention, the wall thickness of the stator can 12 is set to be 0.3 mm.

On the other hand, in order to obtain a certain level of large wall thickness of the stator can 12, it is necessary to enlarge the air gap of the motor portion. Therefore, in the embodiment of the present invention, the synchronous motor method is adopted, which can obtain a relatively larger air gap than the induction motor method. Additionally, as will be described hereinafter, stator slots, motor mold members (epoxy resin) and a reinforcement sleeve that are structures outside the stator can 12 are installed, serving as a pressure-tight construction which supports the stator can 12.

Figure 2:
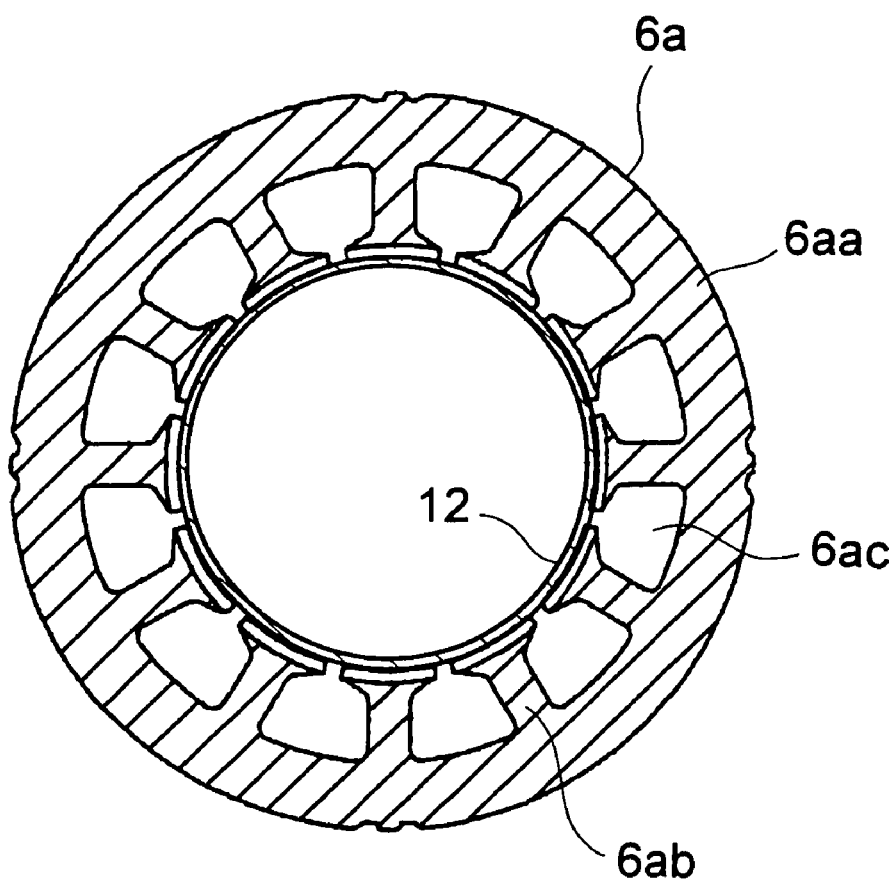
FIG. 2 is a longitudinal cross-sectional view of a stator having stator slots.

FIG. 2 is a longitudinal cross-sectional view of a stator 6a having stator slots and depicts a cross section aa in FIG. 1. As shown in this figure, a plurality number of stator core 6ab are installed at equiangular intervals so as to protrude inward from the inner circumference surface of a core 6aa forming an approximately cylindrical shape of the stator 6a and form a radial pattern. Between each of the stator core 6ab is left stator slots 6ac where a winding wire not being illustrated is installed. Additionally, into the stator slots 6ac is charged epoxy resin, serving as a motor mold member, so as to cover the winding wire. As described above, the stator can 12 being thin-walled and cylindrical is installed on the inner circumference surface of the stator 6a, namely, on the end surface of the stator core 6ab, and is supported from the outside by the stator core 6ab and the motor mold member in the stator slots 6ac.

Now, in a stator 6a, a portion having the above-mentioned stator core 6ab which is indicated with a dimension line "b" in FIG. 1 can be utilized as a member providing strength. However, because a portion having no stator slots which is indicated with a dimension line "c" consists of only a winding wire 14 and a motor mold member 15 which is installed so as to cover the winding wire 14, a force being added to the stator can 12 from the inside cannot be supported only by them, which causes the stress being applied to the stator can 12 to be high. Consequently, by installing a reinforcement sleeve 16 so as to cover the inner circumference surface and the end surfaces of the portion having no stator slots, the stator can 12 is supported, thereby reducing the stress that is generated in the stator can 12.

Chrome molybdenum steel SCM435 and the like are used for the material of the reinforcement sleeve 16. In addition, an O-ring slot 2a is installed onto the outer circumference surface which shares a border with the stator can 12 of the discharge/suction-side casing 2 and an O-ring slot 3b is installed onto the outer circumference surface which shares a border with the stator can 12 of the purging-side casing 3, respectively; and seals are provided by the O-rings that are inserted into these slots. As a result, it will not occur that the fluid flows outside of the stator can 12 and erodes the reinforcement sleeve 16.

Additionally, because the temperature of the fluid serving as a supercritical $CO_2$ fluid is as high as 60° C. and furthermore, because the calorific value inside the motor is large, the motor itself becomes as hot as 100° C. Meanwhile, because the above-described motor mold member (epoxy resin) is considered as a structure member, epoxy resin member having high glass-transition temperature (Tg) is used in order to prevent softening due to such high temperature. When the "Tg" value lowers, it becomes easier for epoxy resin to be softened, thereby coming to play no role as a structure member. In addition, in order to let out the heat from the motor to the outside, such epoxy resin member as has good heat conductance is selected. In this case, by adding, for example, alumina, silica, magnesia and the like to the epoxy resin member, heat conductance is improved.

Furthermore, because bearings are used in a supercritical $CO_2$ fluid (or a liquid $CO_2$) having low viscosity, lubrication provided by the fluid cannot be expected. Therefore, entire ceramics construction is adopted, which can extend the operating life even in such environments as have poor lubricating property. Meanwhile, from the viewpoint of resistance against chemicals, SUS 316L is adopted for the rotor (the main shaft). In consequence, the inner rings of the bearings are made of ceramics, while the rotor is made of SUS 316L, which makes the coefficients of linear thermal expansion of both significantly different. To be more precise, the coefficient of linear thermal expansion of SUS is, for example, $15.4 \times 10^{-6}(1/° C.)$; while the coefficient of linear thermal expansion of ceramics is, for example, $3.4 \times 10^{-6}(1/° C.)$. Therefore, considering effects of an increase in temperature, both are subject to clearance-fitting.

Figure 3:
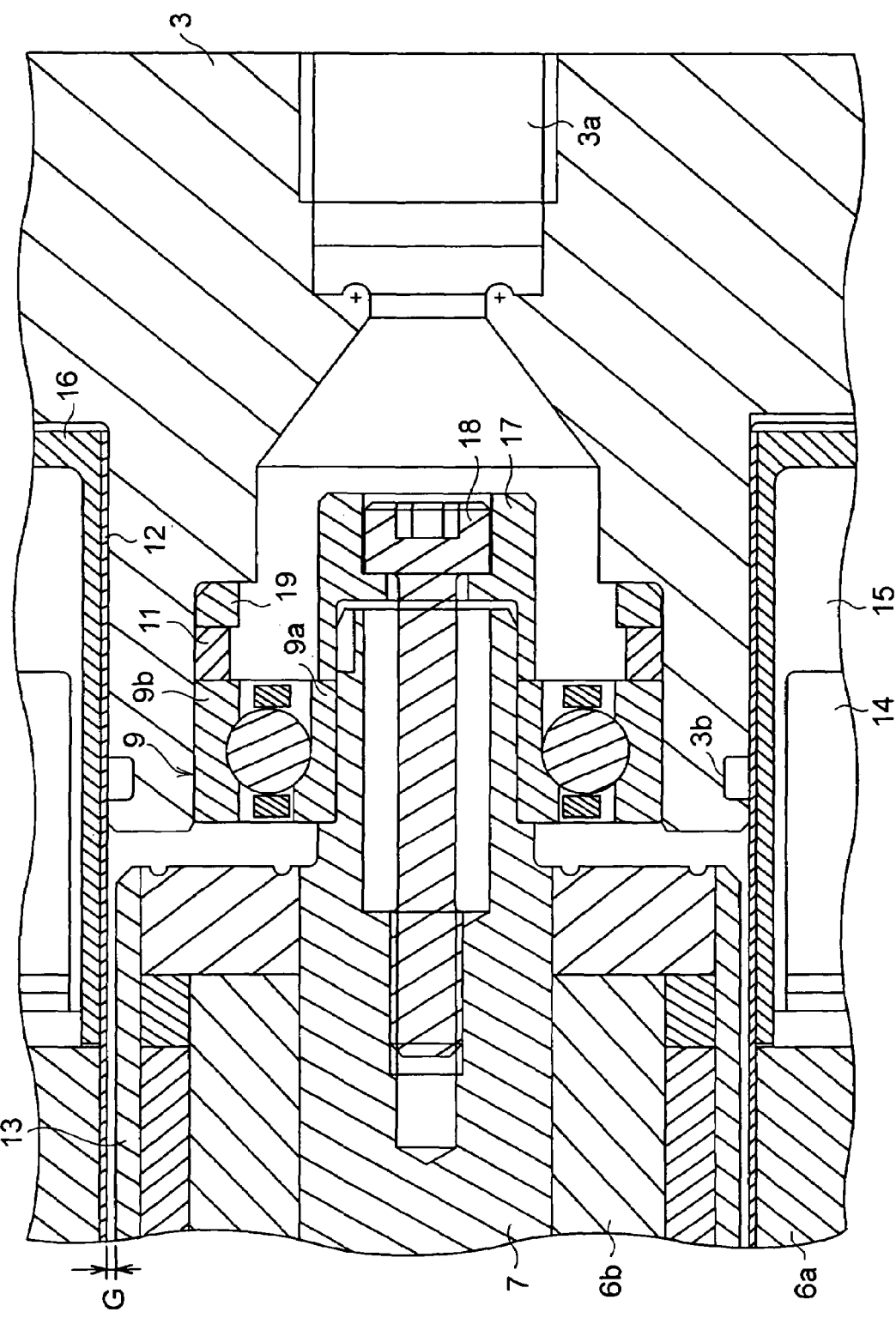
FIG. 3 is a longitudinal cross-sectional view of a necessary portion of a bearing on the purging side and the vicinity thereof.

FIG. 3 is a longitudinal cross-sectional view of a necessary portion of a bearing on the purging side and the vicinity thereof. The degree of the above-mentioned clearance-fitting is set so as to obtain such dimensional relation as the inner circumference surface of the angular ball bearing 9 is attached firmly to the outer circumference surface of the main shaft 7 when the temperature, for example, increases to be as high as 150° C. Normally, because operation is performed in an environment having the temperature as high as 130° C. or less, it does not occur that the main shaft 7 expands excessively enough to destroy the angular ball bearing 9. Additionally, in order to prevent the angular ball bearing 9 from idle running due to execution of such clearance-fitting, it is necessary to fix the angular ball bearing 9. Therefore, as shown in the figure, the angular ball bearing 9 is tightened in the axial direction and fixed by using a bearing-retaining mechanism which is supplied by a bearing retainer 17 having an approximately cylindrical shape.

To be more precise, by tightening the bearing retainer 17 to the main shaft 7 in the axial direction with a bolt 18 which is threadably mounted into the center portion of the main shaft 7 and by catching an inner ring 9a of the angular ball bearing 9 with the bearing retainer 17 and the main shaft 7, the angular ball bearing 9 is fixed to the main shaft 7. Same material, SUS 316L, that is used for the main shaft 7 is used for the bearing retainer 17; and for the bolt 18 is used a material which has a smaller coefficient of linear thermal expansion than SUS 316L. As a result of this, the bolt 18 will not be loosened even though the temperature ascends. In addition, the same fixing method is taken for the angular ball bearing 8 on the discharge/suction side, which is so constructed as has the inner ring of the angular ball bearing 8 caught by the impeller 10 and the main shaft 7.

Moreover, as described above, such construction is adopted as the bearings and the motor are cooled while having a part of the flow from the inlet to the outlet run to the back surface of the impeller and pass through a gap between the rotor and stator so as to flow out through the purging port. In this case, by adjusting the inner construction of the rotor, a design is made, so that the cooling flow volume is optimized. In other words, a trade-off design is performed, taking into consideration the cooling capacity and the efficiency of hydraulic power.

Furthermore, it is necessary to add a preload in order to prevent the bearings from becoming deformed due to the centrifugal force and the temperature and from skidding and to enhance the rigidity of the bearings. In the embodiment of the present invention, as shown in FIG. 3, a load is provided to an outer ring 9b of the angular ball bearing 9 by using a preload spring 11 which is a corrugated plate spring. In addition, between the preload spring 11 and the purging-side casing 3 is installed a shim 19 which is shaped in a ring. By adjusting the thickness of this shim 19, the thrust force caused by the preload spring 11 is adjusted. However, because the corrugated plate spring has an undulating construction having peaks and troughs and because the outer ring 9b of the angular ball bearing 9 slightly rotates, the peaks (portions which are subject to high pressure on the surface) are worn when a normal corrugated plate spring is used.

Figure 4A:
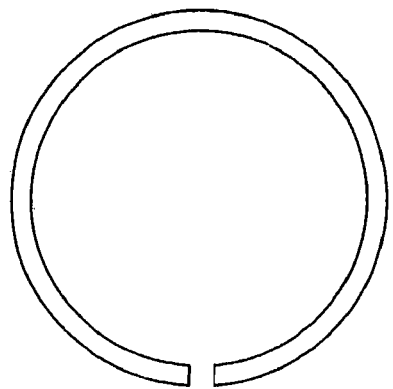
Figure 4A:
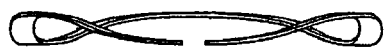
Figure 5A:
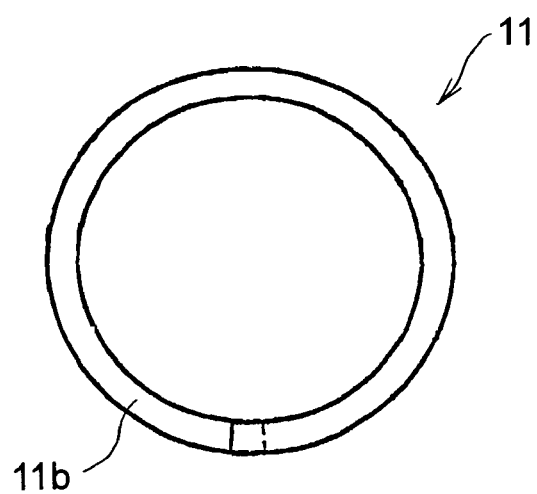
FIG. 5A and FIG. 5B depict the construction of a corrugated plate spring to which end plates are added.
Figure 5B:
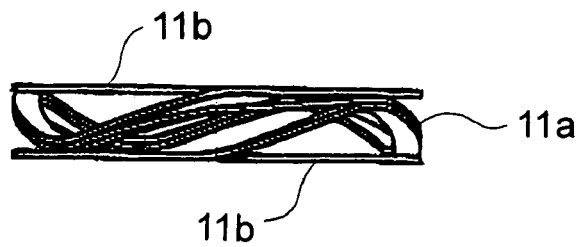

Such corrugated plate spring as described above is shown in FIG. 4A and FIG. 4B. FIG. 4A is a plan view thereof and FIG. 4B is a front view thereof. These figures depict a corrugated plate spring which is shaped in a ring having three peaks. In the embodiment of the present invention, the preload spring 11 is so constructed as to have the construction of a corrugated plate spring to which end plates are added as shown in FIG. 5A and FIG. 5B for purpose of decreasing such wear as mentioned above. FIG. 5A is a plan view thereof and FIG. 5B is a front view thereof. This has both ends of a corrugated plate spring 11a extended and has end plates 11b in a shape of a flat washer formed on the front-back both sides thereof. Because the flat end plates come to closely contact with the outer ring of the bearing by this, the pressure on the surface which is in contact with the outer ring of the bearing is decreased, thereby reducing the amount of wear.

Additionally, because a ball bearing is applied, damping which is provided to the shaft system is small. Consequently, by making a gap between the rotor and the stator smaller, the damping of the shaft system is increased. In other words, as shown in the above-mentioned FIG. 3, by making the gap "G" between the stator can 12 and the rotor can 13 smaller, the portion thereof is so constructed as to receive effects of the bearings. This will be described hereinafter as the relation between the gap and the vibration. First of all, because the object of the present invention is a canned motor pump, the motor is in contact with the fluid. Additionally, the gap "G" between the stator and the motor is narrow and the motor is cooled by having the fluid pass through this gap.

Figure 6:
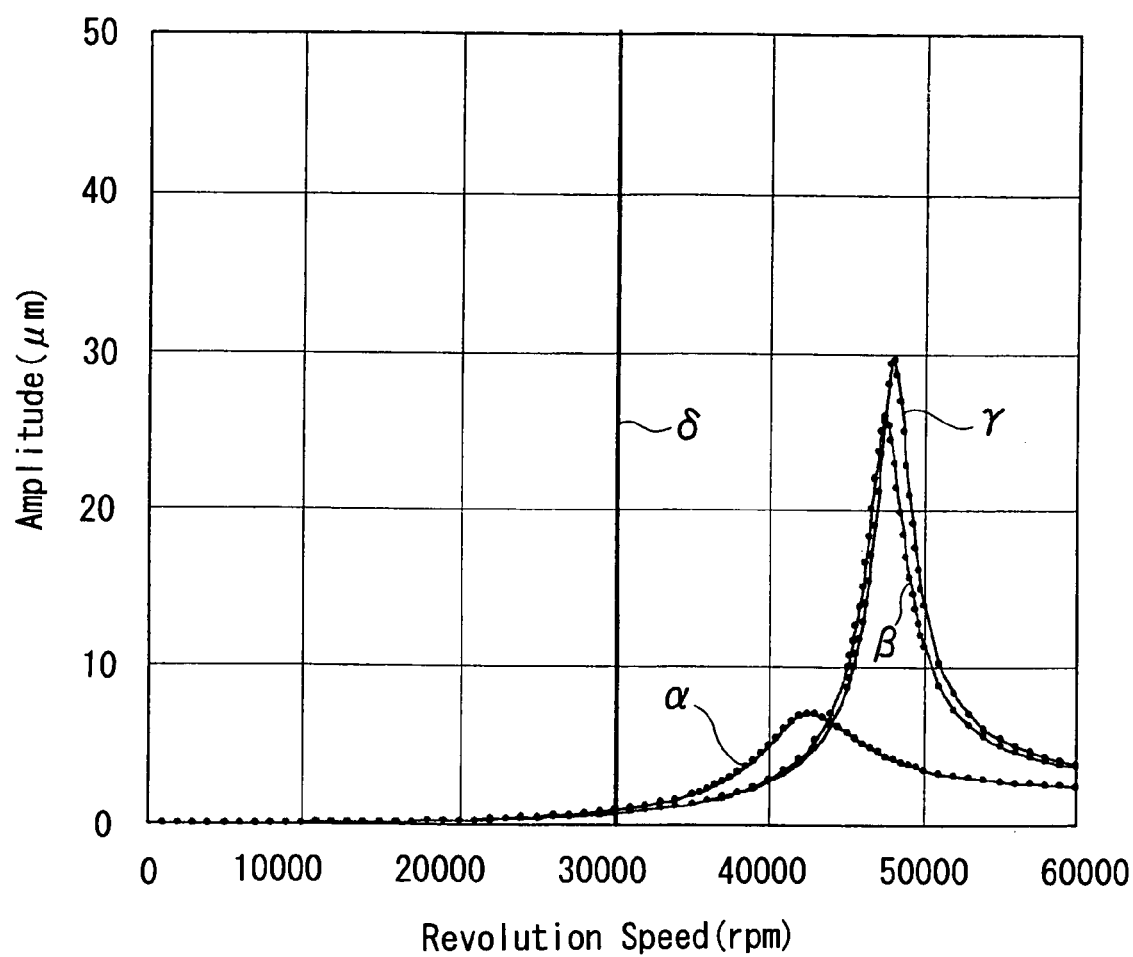
FIG. 6 is a graph showing the relation of the gap between the stator and the rotor versus natural vibration frequency of the shaft system.

As for the relation of the gap between the stator and the rotor with the natural vibration frequency of the shaft system, a graph in FIG. 6 shows the results of calculation by using an actual unit. In this figure, the horizontal axis shows the revolution speed (rpm) and the longitudinal axis shows the amplitude (μm). In this figure, the curve "a" shows a case where the gap "G" is 0.2 mm; the curve "β" shows a case where the gap "G" is 0.5 mm; and the curve "γ" shows a case where the gap "G" is 0.6 mm, respectively; and the straight line "6" shows the revolution speed. The embodiment of the present invention exemplifies a case where the revolution speed is 30000 rpm.

As shown in this figure, when the gap of the motor is small (where "G" is 0.2 mm), added weight increases, which decreases the natural vibration frequency of the shaft system. In this case, by providing the damping to the shaft system by viscosity in the gap, it is possible to make the value of the response to the vibration (Q factor) small. Additionally, when the gap of the motor is large (where "G" is 0.5 mm or 0.6 mm), the added weight decreases, which increases the natural vibration frequency of the shaft system. Here, when the gap is enlarged to a certain degree, there will be no difference in natural vibration frequency although the gap is increased furthermore. In this case, because the gap is large, so that no damping is provided, the value of response to the vibration (Q factor) becomes large.

When a pump is operated at a high revolution speed, it is expected that the natural vibration frequency of the shaft system becomes smaller than the revolution speed. In this case, there is a concern that the revolution speed coincides with the natural vibration frequency while the pump is increasing the speed, which, eventually, makes operation become unstable. For a countermeasure to prevent such an unfavorable problem as described above are considered a countermeasure to remove the characteristic value from the operating range and a countermeasure to lower the value of response (Q factor) in the characteristic value. As described above, when the gap is narrowed, the value of response can be decreased; and when the gap is broadened, the value of response can be increased. Therefore, in the embodiment of the present invention, by utilizing the narrow gap between the rotor and the stator, the optimum gap of the motor is determined from the operational revolution speed and the characteristic value of the shaft system.

Additionally, by positioning the bearings inside the motor, the distance between the bearings and the length of the rotor are shortened. By having the distance between the bearings shortened so as to increase the natural vibration frequency in the bending mode and in addition, by having the weight of the rotor reduced so as to increase the natural vibration frequency in all the modes, the natural vibration frequency is removed from the range of revolution speed.

Furthermore, by adjusting the cooling flow volume and the configuration of the rotor, a thrust force being applied to the rotor system is reduced. Additionally, by using the outside diameter of the rotor for the balance piston, the thrust force is adjusted. This will be described hereinafter as a method of reducing the hydraulic load. To start with, because the object of the present invention is a canned motor pump, the motor is in contact with the fluid. Then, the pressure distribution is different when the gap between the rotor and the stator is in the axial direction from when the gap between the rotor and the stator is in the radial direction. When the gap between the rotor and the stator is in the axial direction, static pressure decreases in accordance with the direction of the flow. Meanwhile, when the gap between the rotor and the stator is in the radial direction, the static pressure increases together with an increase in radius, but the ratio of an increase in static pressure differs, depending on the direction of the flow, the gap and the angle of evolution.

Figure 7:
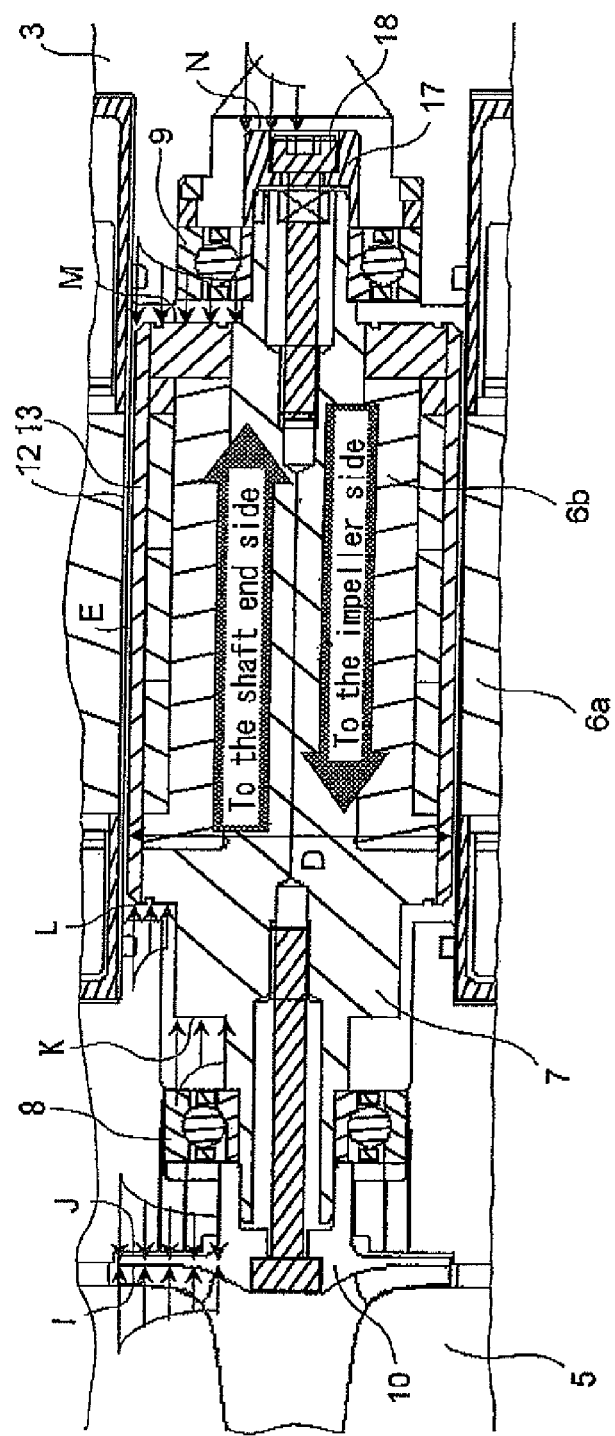
FIG. 7 is a longitudinal cross-sectional view showing a necessary portion of a pump.

FIG. 7 is a longitudinal cross-sectional view showing a necessary portion of a pump. Here, an axial force to the rotor being supplied by the pressure of the fluid is obtained as a calculation of the thrust load. The alphabets "I" through "N" in the figure show major surfaces where the load is provided, and arrows show the distribution of loads on each of the surfaces. When an inward flow is generated in the axial gap, the distribution of the static pressure changes as shown in the graph in FIG. 8. In this figure, the horizontal axis shows the radius, while the longitudinal axis shows the static pressure. Additionally, the curve "α" shows a case where the flow volume is small; the curve "β" shows a case where the flow volume is medium; and the curve "γ" shows a case where the flow volume is large, respectively.

Figure 8:
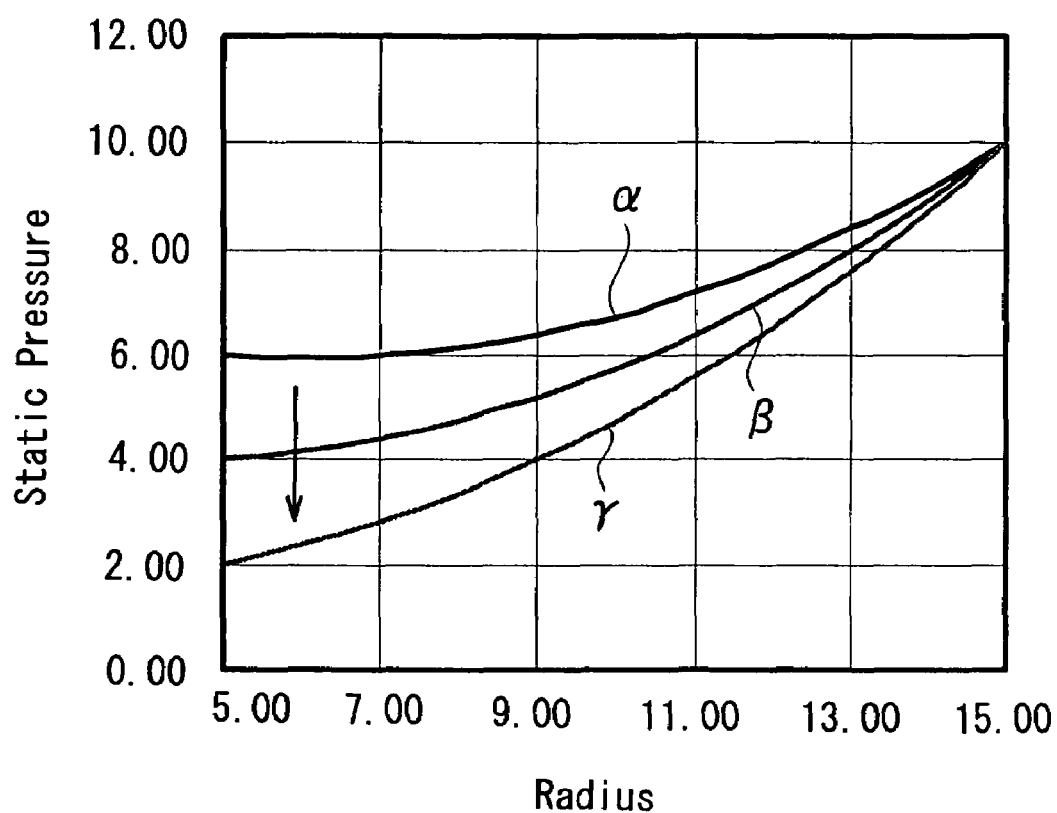
FIG. 8 is a graph showing an inward flow and the pressure distribution.

As shown in FIG. 8, pressure difference between the inlet and the outlet becomes large concurrently with an increase in flow volume (indicated with an arrow). Additionally, when the revolution speed of the fluid increases, the pressure difference is increased. When it is desired to make the revolution speed of the fluid larger, it can be achieved by, for example, installing blades in a shape of a plate to the rotor. On the contrary, when it is desired to make the revolution speed smaller, it can be achieved by installing the blades of the same kind to the stator.

Figure 9:
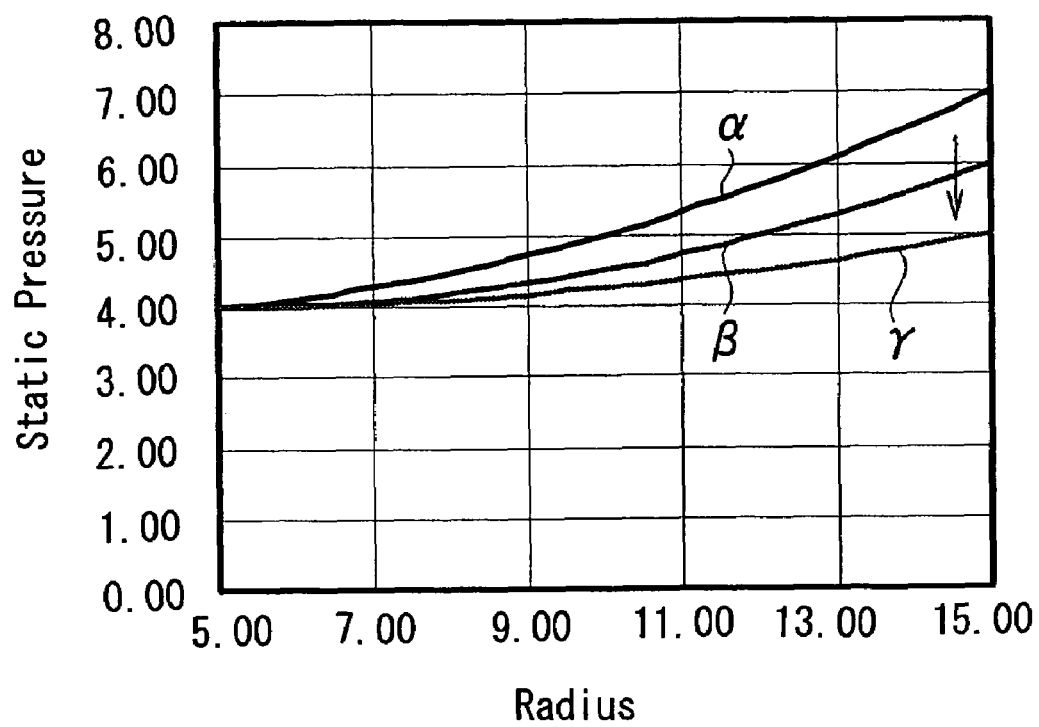
FIG. 9 is a graph showing an outward flow and the pressure distribution.

Moreover, when an outward flow occurs in the axial gap, the distribution of the static pressure changes as shown in the graph in FIG. 9. In this figure, the horizontal axis shows the radius, while the longitudinal axis shows the static pressure.

In addition, the curve "α" shows a case where the flow volume is small; the curve "β" shows a case where the flow volume is medium; and the curve "γ" shows a case where the flow volume is large, respectively.

As shown in FIG. 9, the pressure difference between the inlet and the outlet becomes small concurrently with an increase in the flow volume (indicated with an arrow). Additionally, when the revolution speed of the fluid increases, the pressure difference is increased. When it is desired to make the revolution speed of the fluid larger, it can be achieved by, for example, installing blades in a shape of a plate to the rotor. On the contrary, when it is desired to make the revolution speed smaller, it can be achieved by installing the blades of the same kind to the stator. Furthermore, as shown in each of the figures, when the flow volume is the same, comparison of an inward flow with an outward flow shows that the inward flow has a larger difference in static pressure between the inlet and the outlet.

Next, a method of adjustment of the thrust will be described. When the thrust load being applied to the rotor is provided in the direction of the impeller, the revolution speed of the fluid is increased by installing the blades to the surfaces "M" and "N" of the rotor in FIG. 7, thereby increasing the reduction in pressure between the inlet and the outlet. Moreover, by making an annular gap of the portion "E" small, so as to cause a pressure loss in the portion "E," the thrust load is decreased. Additionally, by enlarging the outside diameter "D" of the rotor, so as to increase the region of load on the surfaces "L" and "M," the load in the direction of the shaft ends is increased. This is attributed to a larger pressure difference between the inlet and the outlet of the inward flow than that of the outward flow, when the flow volume is the same.

Additionally, when the thrust load being applied to the rotor is provided in the direction of the shaft ends, the revolution speed of the fluid is decreased by installing the blades to the static surfaces against the surfaces "M" and "N" in FIG. 7, thereby decreasing the reduction in pressure between the inlet and the outlet. Furthermore, by enlarging the annular gap of the portion "E," the pressure loss generating in the portion "E" is decreased, thereby reducing the thrust load. In addition, by making the outside diameter "D" of the rotor small, so as to decrease the region of load on the surfaces "L" and "M," thereby reducing the load in the direction of the shaft ends. By changing the construction as described above, the hydraulic thrust load is made zero (0).

What is claimed is:

1. A pump conveying a supercritical fluid or a liquid, comprising:
    a suction-side casing forming a body of the pump and having an inlet through which the supercritical fluid or liquid is supplied into the suction-side casing and an outlet through which the supercritical fluid or liquid having a pressure thereof raised is discharged out of the suction-side casing;
    an impeller provided inside the suction-side casing and raising the pressure of the supercritical fluid or liquid present between the inlet and outlet of the suction-side casing;
    a purging-side casing having a purging port through which part of the pumped liquid obtained by sucking in the supercritical fluid or liquid is discharged;
    an outer cylinder held between the suction-side casing and the purging-side casing;
    a main shaft provided in a central part of the outer cylinder and connected to the impeller to transmit a rotating force thereto;
    a first ball bearing supporting the main shaft in the suction-side casing;
    a second ball bearing supporting the main shaft in the purging-side casing;
    a stator arranged inside the outer cylinder and having a winding arranged on a stator core formed as projections formed on an inner circumferential surface of a cylindrical core;
    a rotor arranged inside the stator and arranged on an outer circumferential surface of the main shaft;
    a stator can provided inside the stator to prevent the part of the pumped liquid from entering the stator;
    a rotor can provided outside the rotor to prevent the part of the pumped liquid from entering the rotor;
    a motor mold member filling the inside and outside of the stator, outside of the stator can;
    a reinforcement sleeve provided to cover an inner circumferential surface and end surfaces of the motor mold member located where the stator does not exist outside the stator can; and
    an O-ring provided on a surface at which the suction-side and purging-side casings make contact with the stator can.

2. A pump as claimed in claim 1,
    wherein
    the first ball bearing is fixed as a result of an inner ring thereof being held between the impeller and the main shaft, and
    the second ball bearing is fixed as a result of an inner ring thereof being held between a bearing retainer and the main shaft, the bearing retainer being fastened with a bolt screwed into a center portion of the main shaft.

3. A pump as claimed in claim 2, further comprising:
    preload spring applying a preload to the second ball bearing,
    wherein the preload spring is a single member having, integrally formed,
        a corrugated plate spring and
        end plates formed by extending both ends of the corrugated plate spring to have a shape of a flat washer.

4. A pump as claimed in claim 1, wherein a gap between a stator and a rotor is determined, so as to provide a shaft system of a motor driving said pump with damping.

5. A pump as claimed in claim 1,
    wherein a distance between bearings of a main shaft of said motor is determined to have natural vibration frequency of a motor driving said pump deviate from a region of revolution.

6. A pump as claimed in claim 1,
    wherein, by adjusting a cooling flow volume of a motor driving said pump and a configuration of a rotor, thrust force being applied to a rotor is adjusted.

7. A pump as claimed in claim 1,
    wherein the supercritical fluid or liquid conveyed by the pump contains an acidic fluid.

8. A pump as claimed in claim 1,
    wherein the reinforcement sleeve is formed of chromium molybdenum steel.

9. A pump as claimed in claim 1,
    wherein the stator can is formed of an acid-resistant material.

10. A pump conveying a supercritical fluid or a liquid, comprising:
    a suction-side casing forming a body of the pump and having an inlet through which the supercritical fluid or liquid is supplied into the suction-side casing and an outlet through which the supercritical fluid or liquid having a pressure thereof raised is discharged out of the suction-side casing;

an impeller provided inside the suction-side casing and raising the pressure of the supercritical fluid or liquid present between the inlet and outlet of the suction-side casing;

a purging-side casing having a purging port through which part of the pumped liquid obtained by sucking in the supercritical fluid or liquid is discharged;

an outer cylinder held between the suction-side casing and the purging-side casing;

a main shaft provided in a central part of the outer cylinder and connected to the impeller to transmit a rotating force thereto;

a first ball bearing supporting the main shaft in the suction-side casing;

a second ball bearing supporting the main shaft in the purging-side casing;

a stator arranged inside the outer cylinder and having a winding arranged on a stator core formed as projections formed on an inner circumferential surface of a cylindrical core;

a rotor arranged inside the stator and arranged on an outer circumferential surface of the main shaft;

wherein, the first ball bearing is fixed as a result of an inner ring thereof held between the impeller and the main shaft, and the second ball bearing is fixed as a result of an inner ring thereof being held between a bearing retainer and the main shaft, the bearing retainer being fastened with a bolt screwed into a center portion of the main shaft.

11. A pump as claimed in claim 10, further comprising:

a preloaded spring applying a preload to the second ball bearing.

wherein the preload spring is a single member having, integrally formed, a corrugated plate spring and end plates formed by extending both ends of the corrugated plate spring to have a shape of a flat washer.

* * * * *